(12) United States Patent
Phillips et al.

(10) Patent No.: US 11,127,017 B2
(45) Date of Patent: Sep. 21, 2021

(54) ENABLEMENT OF ENHANCED AUTHORIZATION DECISIONS OF PURCHASES INCLUDING STORED VALUE PRODUCTS

(71) Applicant: MasterCard International Incorporated, Purchase, NY (US)

(72) Inventors: Gregory S Phillips, St Louis, MO (US); Claire Le Gal, New York, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 820 days.

(21) Appl. No.: 15/006,506

(22) Filed: Jan. 26, 2016

(65) Prior Publication Data

US 2017/0213216 A1     Jul. 27, 2017

(51) Int. Cl.
*G06Q 20/40*     (2012.01)
*G06Q 20/34*     (2012.01)
(Continued)

(52) U.S. Cl.
CPC ........... *G06Q 20/405* (2013.01); *G06Q 20/20* (2013.01); *G06Q 20/28* (2013.01); *G06Q 20/34* (2013.01);
(Continued)

(58) Field of Classification Search
CPC ............ G06Q 20/102; G06Q 20/3224; G06Q 20/3278; G06Q 30/0238; G06Q 20/20;
G06Q 20/36; G06Q 20/401; G06Q 20/0855; G06Q 20/40; G06Q 20/4014; G06Q 20/4016; G06Q 30/00; G06Q 30/06;
(Continued)

(56) References Cited

U.S. PATENT DOCUMENTS

2003/0225689 A1* 12/2003 MacFarlane ........... G06Q 20/06
705/39
2004/0167821 A1*  8/2004 Baumgartner ......... G06Q 20/20
705/17
(Continued)

FOREIGN PATENT DOCUMENTS

WO     00/25507 A1    5/2000
WO  2008/079397 A2    7/2008

OTHER PUBLICATIONS

Austrian Economics; "How to Get Your Own Offshore Gold Backed Account, Investment Saturday" (https://web.archive.org/web/20150406205833/http://flagtheory.com/category/investment-saturday) Apr. 6, 2015) (Year: 2015).*
(Continued)

*Primary Examiner* — Elda G Milef
(74) *Attorney, Agent, or Firm* — Buckley, Maschoff & Talwalkar LLC

(57) ABSTRACT

A method and system include identifying at least one stored value product is included in a purchase transaction; calculating an amount of stored value on the stored value product; receiving, by a computer from a merchant device, a payment authorization request for the purchase transaction via a payment card product; transmitting information associated with the stored value product to an issuer of the payment card product. Numerous other aspects are provided.

20 Claims, 5 Drawing Sheets

(51) Int. Cl.
*G06Q 20/20* (2012.01)
*G06Q 20/28* (2012.01)
(52) U.S. Cl.
CPC ......... *G06Q 20/348* (2013.01); *G06Q 20/354* (2013.01)
(58) Field of Classification Search
CPC .... G06Q 30/0601; G06Q 20/28; G06Q 20/34; G06Q 20/409; G06Q 20/4097; G06Q 20/3674; G06Q 20/341; G06Q 20/353; G06Q 20/08; G06Q 20/347; G06Q 20/351; G06Q 20/354; G06Q 20/356; G06Q 20/363; G06Q 20/389; G06Q 20/405; G06Q 20/348
See application file for complete search history.

(56) References Cited

U.S. PATENT DOCUMENTS

| 2006/0190347 | A1* | 8/2006 | Cuervo | G06Q 30/0601 705/26.1 |
| 2008/0162339 | A1* | 7/2008 | Lawe | G06Q 20/10 705/39 |
| 2009/0254480 | A1* | 10/2009 | Esslinger | G06Q 20/40 705/44 |
| 2010/0121764 | A1* | 5/2010 | Niedermeyer | G06Q 20/28 705/44 |
| 2010/0191605 | A1* | 7/2010 | Nuttall | G06Q 20/10 705/17 |
| 2012/0221422 | A1* | 8/2012 | Sobek | G06Q 20/349 705/17 |
| 2015/0206134 | A1* | 7/2015 | Rodning | G06Q 20/342 705/41 |
| 2015/0302394 | A1 | 10/2015 | Harper | |

OTHER PUBLICATIONS

"A Summary of the Roundtable Discussion on Stored-Value Cards and Other Prepaid Products." The Federal Reserve Board. Jan. 12, 2005. (Year: 2005).*

"PCT Notification of Transmittal of the International Search Report and Written Opinion", International Searching Authority, dated Apr. 3, 2017 (Apr. 3, 2017), for Application No. PCT/US2017/014653, 12pgs.

* cited by examiner

ENABLEMENT OF ENHANCED AUTHORIZATION DECISIONS OF PURCHASES INCLUDING STORED VALUE PRODUCTS

BACKGROUND

The use of stored value products is ever-increasing among consumers. Stored value products have emerged as a significant market opportunity with billions of dollars associated therewith. Stored value products are readily available in retail channels and stores. These types of retailers conventionally are identified in authorization and clearing records under a general purpose merchant category code (MCC), as it is the MCC that may best describes their overall business.

Fraudsters cash out counterfeit, lost and stolen payment card products (e.g., credit cards and debit cards) by funding and/or purchasing stored value products. However, as there may be no indicators in the authorization or clearing records to identify the purchase of stored value products, the current fraud losses associated with these funding and/or purchasing transactions may not be quantified.

The present inventors have now realized that it may be desirable to provide additional information in the authorization and clearing records to account for the stored value products.

DETAILED DESCRIPTION

The use of stored value products is ever-increasing among consumers. Stored value products have emerged as a significant market opportunity with billions of dollars associated therewith. Stored value products are readily available in retail channels and stores. These types of retailers conventionally are identified in authorization and clearing records under a general purpose merchant category code (MCC), as it is the MCC that may best describes their overall business.

As used herein, a stored value product is a product that retains its value at the time of purchase. In other words, a stored value product may be purchased or funded, and the product retains the value stored on the product until that value is used up by purchases or transfers. Stored value products may include, for example, pre-paid products (e.g., both open and closed loop prepaid cards), air time cards (e.g., cards that allow mobile subscribers to add time to their phone) and other similar products. The purchase of consumables such as fast food or a candy bar is not a stored value product.

Fraudsters cash out counterfeit, lost and stolen payment card products (e.g., credit cards and debit cards) by funding and/or purchasing stored value products. For example, a fraudster may use a counterfeit payment card product (e.g., a credit card) to purchase one or more pre-paid cards. However, as there may be no indicators in the authorization or clearing records to identify the purchase of stored value products, there may be no way to track these fraudulent transactions. As such, the current fraud losses associated with these funding and/or purchasing transactions may not be quantified.

Embodiments of the invention provide a method and system to identify stored value products in purchase transactions. The identification of the stored value products may allow for the freeze or blockage of accounts with outstanding balances that were fraudulently funded. The inventors note that stored value funding information may be valuable in the authorization process and an advantage of embodiments of the invention is the saving of millions of dollars of fraud.

Figure 1:
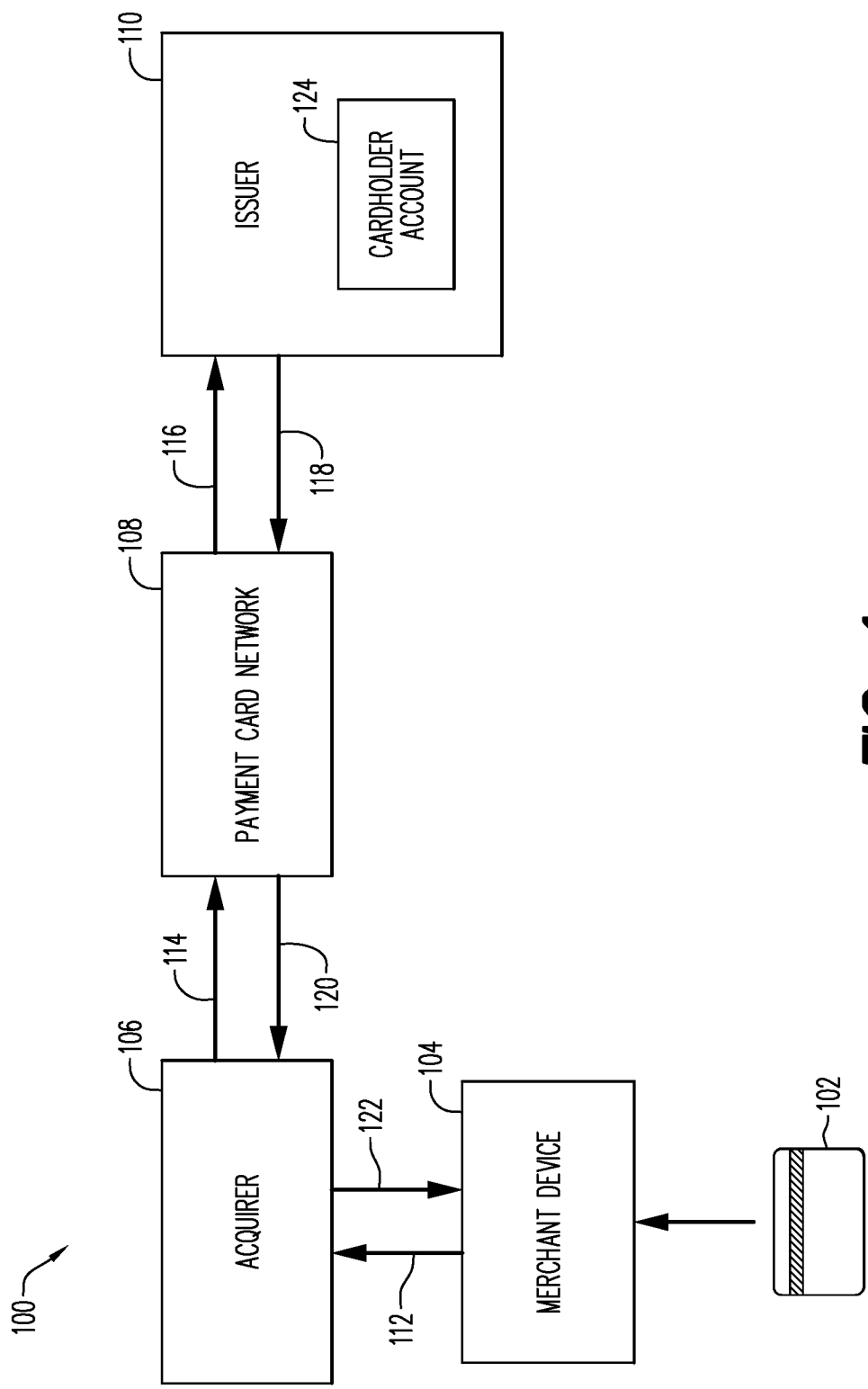
FIG. 1 is a schematic block diagram representation of a payment system.

FIG. 1 is a block diagram that illustrates a payment system 100 and a transaction as carried out by using the payment system 100 provided in accordance with aspects of the present disclosure.

To initiate the transaction, a customer (not shown) visits a retail store (not shown) operated by a merchant, selects goods (not shown) that he/she wants to purchase, carries the goods to a merchant device 104, such as a point of sale terminal, and presents his/her payment card 102 to the point of sale terminal merchant device. In one or more embodiments, the goods include a stored value product. The merchant device 104 reads the customer's payment card account number from the payment card 102, and then sends an authorization request to an acquirer financial institution (FI) 106, with which the merchant maintains a relationship. The authorization request typically includes the payment card account number (PAN), the amount of the transaction and other information. The authorization request does not typically include information that the purchase includes one or more stored value products. The authorization request is routed via a payment card network 108 to the issuer financial institution (FI) ("Issuer") 110 that issued the customer's payment card 102. Arrows 112, 114 and 116 trace the path of the authorization request from the merchant device 104 to the Issuer 110.

Assuming that all is in order, the issuer FI 110 transmits a favorable authorization response to the merchant device 104 through the payment card network 108 and via the acquirer FI 106. (The path of the authorization response from the issuer FI 110 to the merchant device 104 is traced by arrows 118, 120, 122.) The transaction at the merchant device 104 is then completed and the customer leaves the store with the goods. A subsequent clearing transaction initiated by the merchant results in a transfer of the transaction amount from the customer's payment card account 124 to an account that belongs to the merchant. The customer's payment card account 124 may be, for example, either a debit card account or a credit card account. In the former case, the clearing transaction results in the funds being debited directly from the account 124. In the latter case, the clearing transaction results in a charge being posted against the account 124, and the charge subsequently appears on the customer's monthly credit card statement.

The foregoing description of the typical transaction may be considered to be somewhat simplified in some respects. For example, a merchant processing system (not shown) may be interposed between the merchant device and the acquirer FI. As is familiar to those who are skilled in the art, a merchant processing system may be operated by or on behalf of the merchant to form part of the communications path between the acquirer FI and a considerable number of merchant devices operated by the merchant. It is also often the case that a third party transaction processing service, such as a payment services provider (PSP), may operate to handle payment card transactions on behalf of the acquirer and on behalf of a large number of other like financial institutions.

Figure 2A:
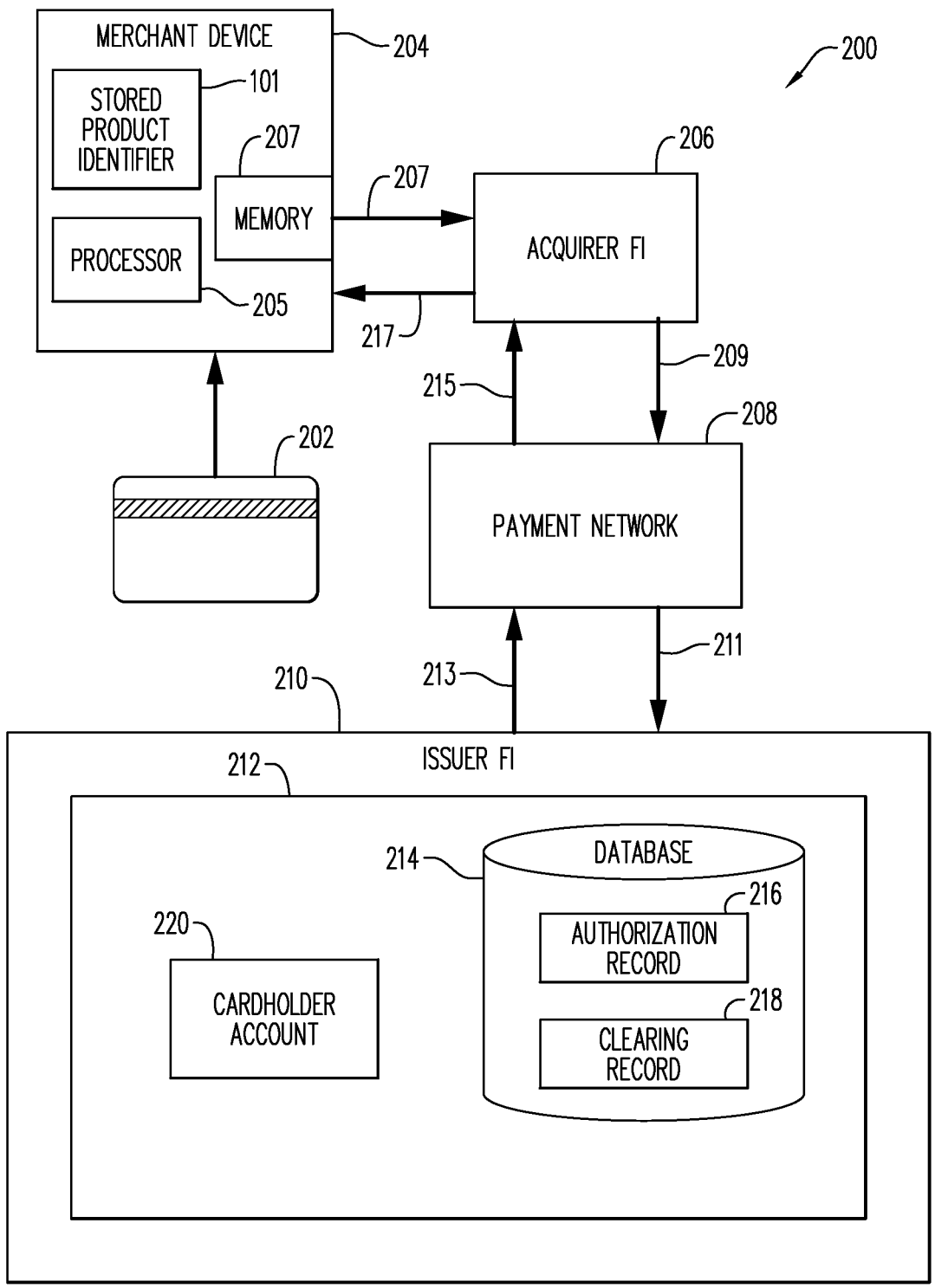
FIG. 2A is a schematic block diagram representation of a payment system, in accordance with some aspects of some embodiments herein.
Figure 2B:
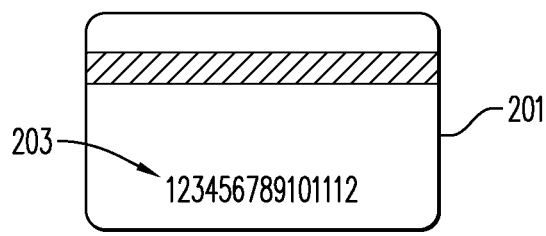
FIG. 2B is a diagram of an example of a stored value product, in accordance with some aspects of some embodiments herein.
Figure 3:
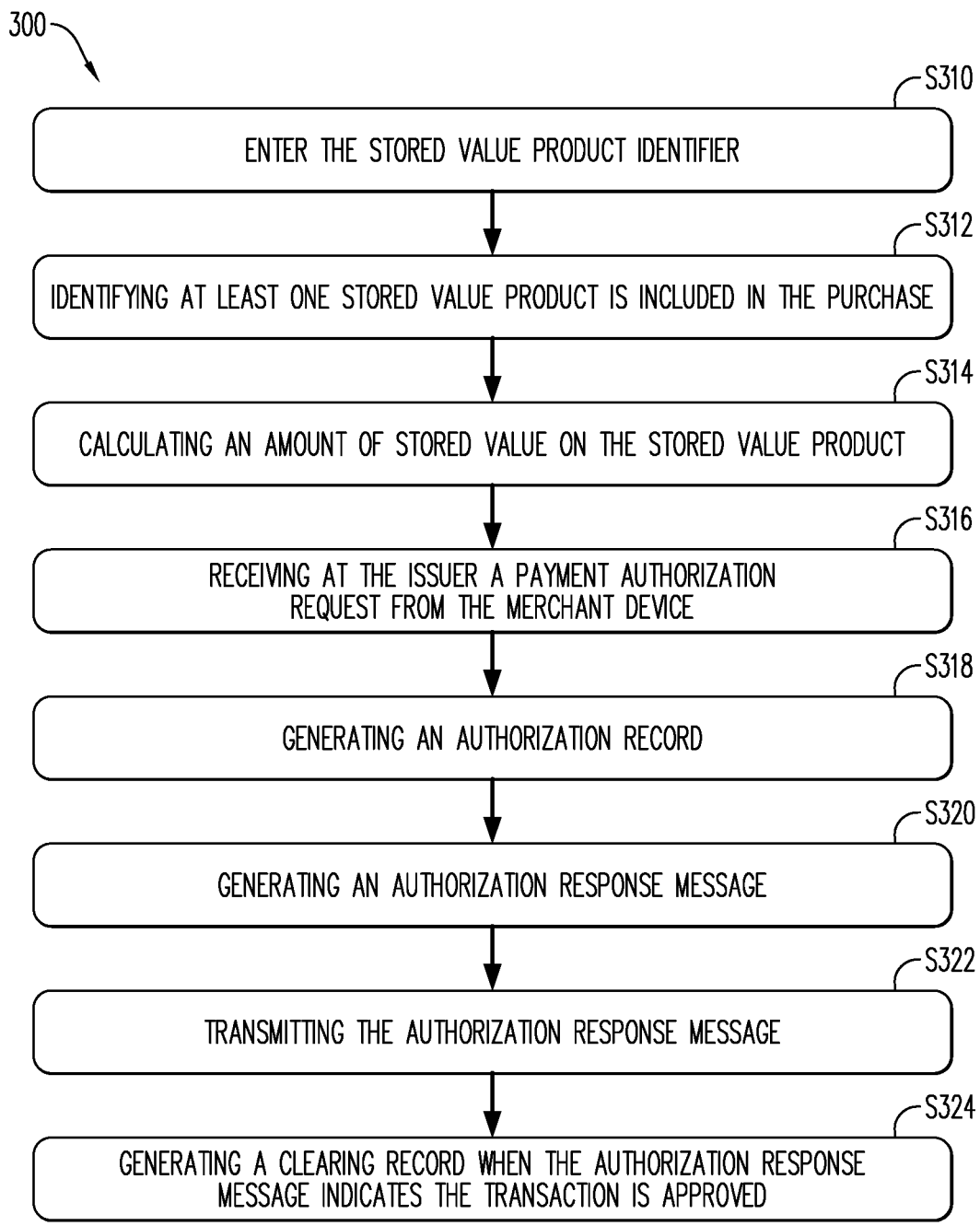
FIG. 3 is a flow diagram illustrating a process that may be performed in accordance with aspects of some embodiments herein.

Turning to FIGS. 2A-3, FIG. 3 illustrates a method 300 that may be performed by some or all of the elements of system 200 described with respect to FIGS. 2A and 2B according to some embodiments of the present invention. The flow chart(s) described herein do not imply a fixed order to the steps, and embodiments of the present invention may be practiced in any order that is practicable. Note that any of the methods described herein may be performed using any suitable combination of hardware (e.g., circuit(s)), software or manual means. For example, a non-transitory computer-readable storage medium (e.g., a fixed disk, a floppy disk, a CD, a DVD, a Flash drive, or a magnetic tape) may store thereon instructions that when executed by a machine result in performance according to any of the embodiments described herein. In one or more embodiments, the system 200 is conditioned to perform the process 300, such that the system 200 is a special purpose element configured to perform operations not performable by a general purpose computer or device.

Figure 6:
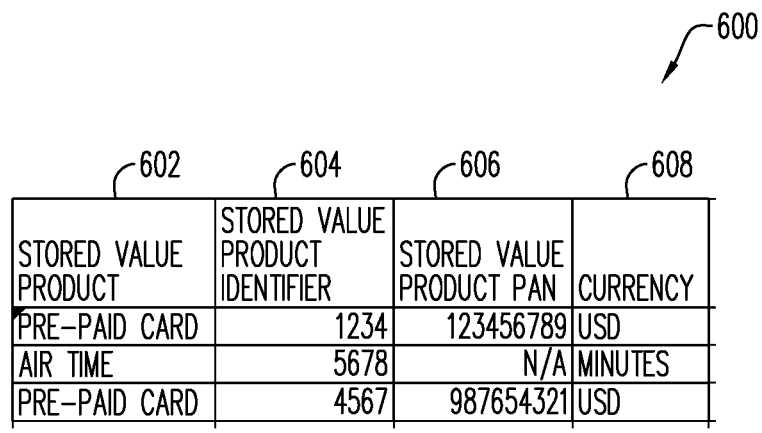
FIG. 6 is a table in accordance with some aspects of some embodiments herein.

In one or more embodiments, prior to beginning process 300, a merchant may identify every stored value product 201 (FIG. 2B) for sale with a stored value product identifier 203. The identifier 203 may be a stock keeping unit (SKU), a universal product code (UPC), a payment account number (PAN), or any other suitable identifier. As described above, a stored value product may be defined as a product that retains its value at the time of purchase. Some examples of stored value cash products/transactions include, but are not limited to, prepaid cards, air time card, purchase of travelers cheques, foreign currency money orders, precious metals, or savings bonds, a customer accepting a MasterCard payment card in direct payment of an existing debt, such as a private label card or vehicle loan. As used herein, a MasterCard payment card may include all MasterCard brands (e.g., MasterCard, Cirrus and Maestro) and all types of cards (e.g., credit, debit and prepaid). The merchant may create a table of products 600 (FIG. 6) available for sale that meet the definition of a stored value product and load the table 600 into the merchant device system. The table 600 may define fields 602, 604, 606, and 608 for each of the entries. The fields 602, 604, 606 and 608, may, according to some embodiments, specify: a stored value product 602, a stored value product identifier 604, a stored value product payment account number (PAN) 606, and a currency 608. Other suitable fields may be used in addition to, or instead of, the fields listed herein. The stored value product table 600 may be a database that may be created and updated, for example, based on information electrically received on a periodic basis.

In one or more embodiments, a pre-authorization process may be executed prior to the purchase of the stored value product 201 as part of a risk based decision based process. During the pre-authorization process, an individual may be registered as a prior customer. Other factors may also be considered during the pre-authorization process (e.g., the nature of the transaction including whether the purchase includes the one or more stored value products). The pre-authorization process may be used to determine whether an individual is authorized to purchase a prepaid product.

Initially at S310, a merchant, cashier or consumer (in the instance of a self-checkout), scans, or otherwise enters, the stored value product identifier 203 of the stored value product 201 at a merchant device 204 during a purchase transaction, where one or more stored value product 201 is included in the purchase transaction. In one or more embodiments, entry of the stored value product identifier 203 may activate the stored value product 201. In one or more embodiments, one or more stored value products 201 may be the only items included in the purchase transaction. The stored value product identifier 203 may enable the merchant to determine if the stored value product 201 has stored value when activated (e.g., the stored value is available for use). While the example purchase transactions described herein occur at a brick and mortar retail store, in one or more embodiments the purchase transaction may occur via an online store.

Then at S312, the merchant device 204 identifies the stored value product 201 as a stored value product via the stored value product identifier 203. For example, for the identification, the merchant device 204 may compare a product identifier (e.g., SKU, CPU or PAN) for each product included in the purchase to the stored value product identifier 203 in the table of products 600. In one or more embodiments, if the identifier is included in the table, the product may be a stored value product. Other suitable identification processes may be used. Then, at S314, after the merchant device 204 has identified the stored value product 201, the merchant device 204 may calculate an amount of stored value on the stored value product 201. As used herein, in addition to the physical merchant device in the checkout lane, the merchant device 204 may also refer to the program code used to execute these steps. As described further below, processing elements 205 and memory 207 of the merchant device 204 may collect and store information, as well as compare information to lists and functions. The information may form a record that may be transmitted either directly to the merchant's acquiring bank or to their processor, who, in turn, may reformat the records to suit the record formats for authorization and clearing associated with the various card schemes.

The customer presents his/her payment card 202 to the merchant device 204. The merchant device 204 may be a Point of Sale (POS) device by which the merchant may enter information about the goods to be purchased, and which may receive payment information from the consumer for the consumer purchase. In one or more embodiments, the POS device may be a POS terminal (e.g., a fixed POS station) or a suitably programmed mobile telephone or PDA (personal digital assistant) with communication capabilities (e.g., a wireless POS station).

The merchant device 204 may include one or more processing elements 205. The processor 205 may, for example, be a conventional microprocessor, and may operate to control the overall functioning of the merchant device 204. The merchant device 204 may also include conventional peripheral components (not shown), in communication with and/or controlled by the processor, including but not limited to: (a) a keypad for receiving input from the human operator of the POS terminal or a customer; (b) a magnetic stripe reader for reading payment card account numbers and related information from magnetic stripe payment cards; (c) one or more displays for providing output (e.g., identifying products presented for purchase and their prices, indicating transaction subtotals and totals, indicating transaction status, etc.); and (d) a communication controller for allowing the processor, and hence the merchant device 204, to engage in communication over data networks with other devices (e.g., a merchant processing system (not shown), an Acquirer 206 or its transaction processor (not shown), an Issuer 210, etc.). In one or more embodiments, at least one of the displays may be a touch screen, so as to provide an input function as well as an output function. In one or more embodiments, the merchant device 204 may include one or more memory and/or data storage devices 207, which may comprise any combination of one or more of a hard disk drive, RAM (random access memory), ROM (read only memory), flash memory, etc. The memory/data storage devices 207 may store software and/or firmware that programs the processor 205 and the merchant device 204 to perform functionality as described herein.

The merchant device 204 may read the customer's payment card account number from the payment card 202, and then at S316, a payment authorization request is received from the merchant device 204 by a computer at an issuer financial institution (FI) ("Issuer") 210 that issued the customer's payment card 202. In one or more embodiments, S314 may occur before or at substantially the same time as S316. The authorization request may be routed from the merchant device 204 to the Issuer 210 via an acquirer financial institution (FI) 206, with which the merchant maintains a relationship, and then a payment card network 208. The authorization request may include the payment card account number (PAN), the amount of the total purchase transaction, cash back (if any), the amount of funding for the stored value product, and other information. In one or more embodiments, all amounts, including purchase, cash back, stored value product funding and total transaction may be in the same currency in the authorization request.

In one or more embodiments, the Acquirer 206 may operate an acquirer processor. As used herein, the acquirer processor may be referred to as "Acquirer." The Acquirer 206 may operate in a conventional manner to receive an authorization request for a payment account transaction from the merchant device 204. The Acquirer 206 may request the PAN and once the Acquirer 206 receives the PAN, the Acquirer 206 may modify the request (e.g., check and enhance the request with additional data fields such as a fraud score by the payment system) and then route the authorization request via the payment network 208 to the Issuer 210 for authorization. In one or more embodiments, the Issuer 210 may include a server computer or processor operated by the Issuer.

The Issuer 210 may be operated by or on behalf of a financial institution or Issuing Bank of the payment card ("Issuer"). For example, the Issuer 210 may perform such functions as (a) receiving and responding to requests for authorization of payment account transactions to be charged to payment accounts issued by the Issuer; and (b) tracking and storing transactions and maintaining account records.

The components of the system 200 as depicted in FIG. 2A are only those that are needed for processing a single transaction. A typical payment system may process many purchase transactions (including simultaneous transactions) and may include a considerable number of payment account issuers and their computers/processors, a considerable number of acquirers and their computers/processors, and numerous merchants and their computer systems.

The Issuer 210 may include a storage device/memory 212. The storage device 212 may comprise any appropriate information storage device, including combinations of magnetic storage devices (e.g., a hard disk drive), optical storage devices, mobile telephones, and/or semiconductor memory devices. In some embodiments, the storage device 212 may further store a stored value product database 214, which may include an authorization record 216 and a clearing record 218. In one or more embodiments, each authorization request generates an authorization record 216 at S318 for association with the request. In one or more embodiments, the Issuer 210 may analyze the information received from the Acquirer 206 and may insert an authorization response code into the authorization record 216 before returning the authorization record to the merchant device 204 via the payment network 208 and Acquirer 206, each of whom may alter/enhance the record on its way back to the merchant. In one or more embodiments, the merchant device 204 may send the authorization records request to a service provider, who may format and send the authorization record 216 to the Acquirer 206. The merchant device 204 may generate the clearing record 218 based on the completed transaction and may send the clearing record through the same path to the Issuer 210.

The authorization record 216 may include the total transaction amount (inclusive of the purchase (if any), cash back (if any) and the calculated stored value product funding amounts. As used herein, the "stored value product funding amount" is the amount of value stored on one or more stored value products. For example, if there were three prepaid cards worth $50 each, then the stored value product funding amount (calculated at the merchant) would be $150. The stored value product funding amount ($150) may be the amount transmitted to the Acquirer 206, the payment network 208 and the Issuer 210. In one or more embodiments, the calculated stored value product amount may be stored in existing fields in the authorization record 216 in the database 214. In one or more embodiments, the calculated stored value product amount may be stored in a new field in the authorization record 216 in the database 214. The inventors note that a benefit of using an existing field may be to save time and money as the infrastructure already exists. For example, in one or more embodiments, the total transaction amount, cash back and calculated stored value product funding amount may be reflected in an existing "amount/transaction" field in the authorization record 216. In some embodiments, an existing "cardholder transaction type" sub-field associated with the "amount/transaction" field may be populated with a new value—"purchase with stored value product funding/re-load/top-up." In one or more embodiments, an existing "amount type" subfield associated with the "amount/transaction" field may be populated with a new value—"amount stored value," as calculated in S314. In one or more embodiments, the existing "currency code" subfield associated with the "amount/transaction" field may continue to reflect the currency of the purchase. In one or more embodiments, the "amounts, additional" subfield associated with the "amount/transaction" field, may reflect the aggregate stored value product amount.

In one or more embodiments, supplemental identifying data may be stored in a private data elements portion of the authorization record 216. In some embodiments, supplemental identifying data may include the stored value product identifier 203 (e.g., PAN for a prepaid card or SKU or CPU for the prepaid card or other products). The supplemental information may be stored safely and securely in an encrypted file following Payment Card Industry (PCI) standards.

The payment card 202 must be valid and have a sufficient credit line to allow the purchase. As such, in addition to a credit risk assessment and other assessments made by the Issuer 210 in response to the authorization request, the Issuer 210 may also execute a fraud risk assessment to determine the risk of fraud associated with the transaction. In one or more embodiments, information that the purchase includes one or more stored value products 201, may be used by a payment authorization platform (not shown) at the Issuer 210 during the authorization decision process. The additional information that the purchase includes the stored value product 201 may be a significant factor in the authorization platform's decision to approve or decline the transaction. In one or more embodiments, other stakeholders (e.g., different from the Issuer) may be involved in the decision to approve or decline the transaction and these other stakeholders may also use the information that the purchase includes one or more stored value products in the decision.

Arrows 207, 209 and 211 trace the path of the authorization request from the merchant device 204 to the Issuer 210.

Turning back to method 300, after a determination is made whether to approve, partially approve or decline the authorization request, based on standard business logic, the Issuer 210 may respond to the authorization request by generating an Authorization Response Message in S320. In one or more embodiments, a partial approval may be an approval of the request for an amount less the calculated amount of stored value on the stored value product. In one or more embodiments, response messages may be limited to approved, or declined. In one or more embodiments, response messages may be limited to approved, partially approved (e.g., approval of only the non-stored value product purchase), or decline.

Turning to S322, an Authorization Message is transmitted to the merchant device 204. If the Authorization Response Message from the Issuer 210 is positive, the Acquirer 206 sends an approved or partially approved authorization message to the merchant device 204 with the appropriate data suitable elements. If the Authorization Response Message from the Issuer 210 is negative, the Acquirer 206 sends a decline authorization message to the merchant device 204. The path of the authorization response from the Issuer 210 to the merchant device 204 is traced by arrows 213, 215, 217.

If all is in order, and the Issuer FI 210 transmits a favorable authorization response to the merchant device 204, the transaction at the merchant device 204 is then completed and the customer leaves the store with the goods. A subsequent clearing transaction initiated by the merchant results in a transfer of the transaction amount from the customer's payment card account 220 to an account that belongs to the merchant. The customer's payment card account 220 may be, for example, either a debit card account or a credit card account. In the former case, the clearing transaction results in the funds being debited directly from the account 220. In the latter case, the clearing transaction results in a charge being posted against the account 220, and the charge subsequently appears on the customer's monthly credit card statement. During the clearing transaction, the clearing record 218 is generated at S324. The clearing record 218 may include the value of the stored value product, as well as additional information supplied by the merchant, such as the payment account number (PAN) on the stored value product or other identifier 203 on the stored value product 201. In one or more embodiments, the clearing record 218 may also include a more specific description of the purchase (e.g., "purchase includes one or more stored value items;" and specific stored value vendor information, such as vendor name, address, general contact information and fraud contact number. Other suitable information may be included in the clearing record. In one or more embodiments, the value of the stored value product 201, as well as additional information supplied by the merchant, such as the payment account number (PAN) on the stored value product or other identifier 203 on the stored value product 201 stored in the clearing record 218 may share existing fields in the clearing record 218.

In one or more embodiments, the information related to the stored value product 201 in the authorization record 216 and clearing record 218 (e.g., payment card account number (PAN), the amount of the total purchase transaction, cash back (if any), the amount of funding for each of the stored value products, and other information) may be accessed after notification to the Issuer 210 that the stored value product 201 was involved in a fraudulent transaction. For example, if the funding transaction is initially approved but is subsequently determined to be fraudulent, after notification of the fraud, the Issuer 210 may notify a service provider (not shown), who may hold the stored value product specific information. The independent service provider may be MasterCard, for example. In one or more embodiments, the independent service provider may also maintain the above-described information related to the stored value product in the authorization record 216 and clearing record 218, and may use the information to contact several parties regarding the fraud if the funding transaction involves a fraudulently used payment card. For example, upon notification by the Issuer that the payment card used to purchase a stored value product was fraudulently used, the service provider may contact the Stored Value Product Vendor (e.g., the entity that offers and manages the stored value product.) In the case of a prepaid card, the Stored Value Product Vendor may be the issuer of the prepaid card (not the issuer FI of the MasterCard payment card that the consumer used to fund the stored value product). In the case of an air-time stored value product, the Stored Value Product Vendor may be the mobile company that offers the service. The service provider may also contact an independent secure service provider. Supplemental vendor information provided by the merchant may be maintained and held in escrow by the independent and secure service provider until which time it may be needed to stop fraudulent activity. The service provider may also contact the entity that controls the stored value product and that received the funds to determine whether there are any remaining funds associated with the stored value product to freeze and recover pending a dispute resolution period with a holder of the stored value product. The service provider may block transactions of the stored value product under suspension until the situation is resolved.

Figure 4:
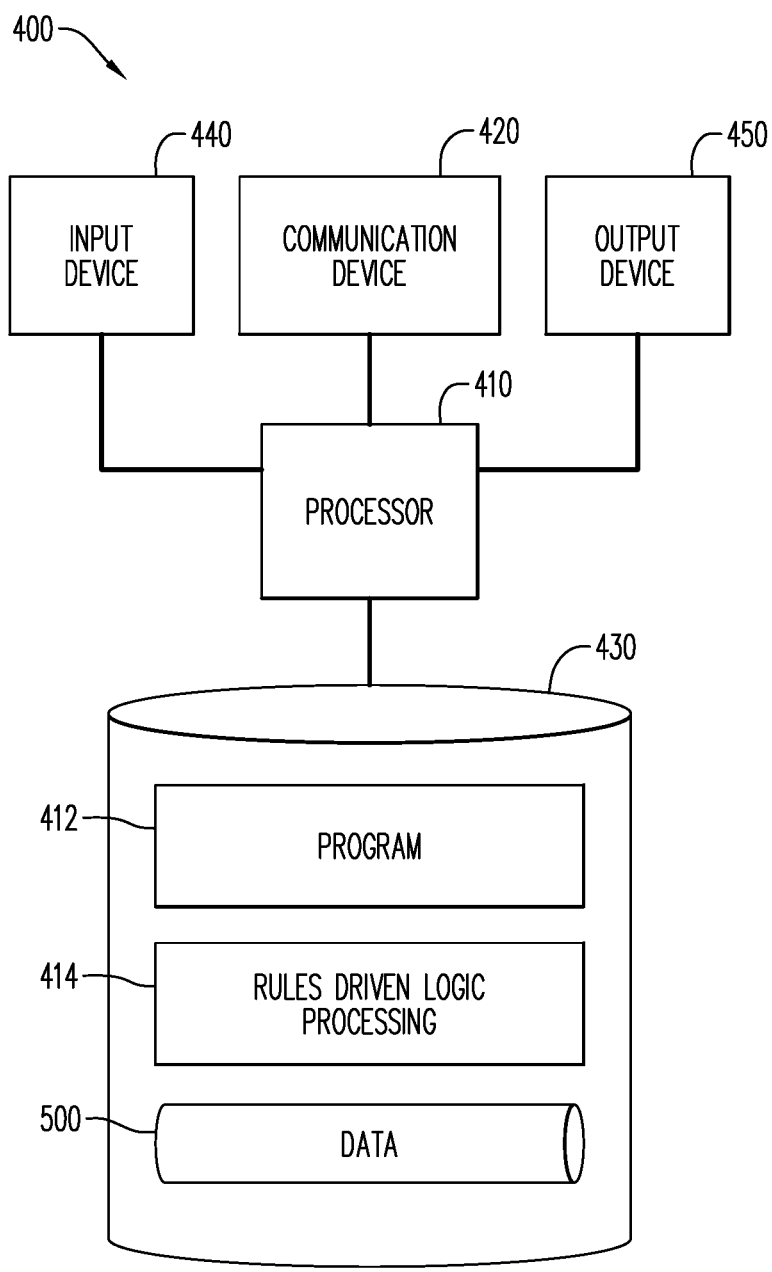
FIG. 4 is a block diagram of a system, in accordance with some aspects of some embodiments herein embodiments.

Note that the embodiments described herein may be implemented using any number of different hardware configurations. For example, FIG. 4 illustrates a Stored Value Product Platform 400 that may be, for example, associated with the stored value product system 200 of FIG. 2A. In one or more embodiments, the platform 400 may be stored at one of the merchant device 204 and the Issuer 210. The Stored Value Product Platform 400 comprises a stored value product processor or module 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more users or computers. The Stored Value Product Platform 400 further includes an input device 440 (e.g., a computer mouse and/or keyboard to enter information) and an output device 450 (e.g., a computer monitor or printer to output a transaction information report).

The processor 410 also communicates with a storage device/memory 430. The storage device 430 may comprise any appropriate information storage device, including combinations of magnetic storage devices (e.g., a hard disk drive), optical storage devices, mobile telephones, and/or semiconductor memory devices. The storage device 430 stores a program 412 and/or stored value product platform logic 414 for controlling the processor 410. The processor 410 performs instructions of the programs 412, 414, and thereby operates in accordance with any of the embodiments described herein. For example, the processor 410 may receive a purchase authorization request which may then be analyzed by the processor 410 to automatically determine whether the transaction includes a stored value product.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" or "retrieved" by or "transmitted" to, for example: (i) the Stored Value Product Platform 400 from another device; or (ii) a software application or module within the Stored Value Product Platform 400 from another software application, module, or any other source.

In some embodiments (such as shown in FIG. 4), the storage device 430 further stores a stored value product database 213/500. Some examples of databases that may be used in connection with the Stored Value Product Platform 400 will now be described in detail with respect to FIG. 5. Note that the database described herein is only an example, and additional and/or different information may actually be stored therein. Moreover, various databases might be split or combined in accordance with any of the embodiments described herein.

Figure 5:
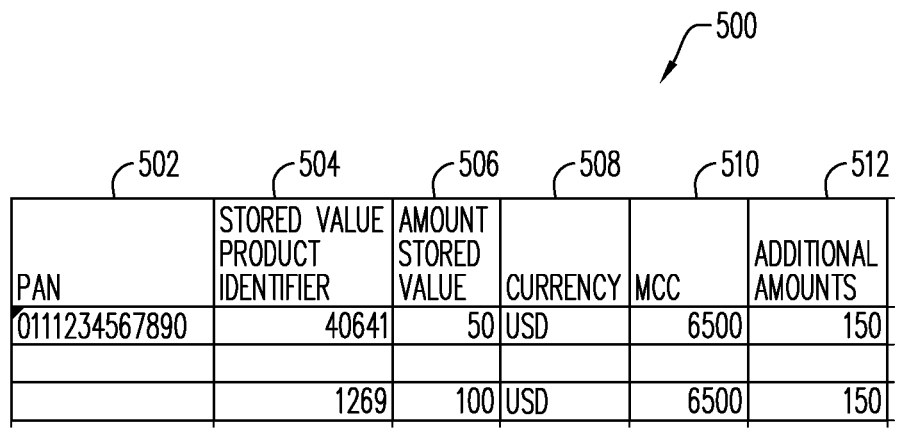
FIG. 5 is a table in accordance with some aspects of some embodiments herein.

Referring to the stored value product database in FIG. 5, a table 500 is shown that represents the stored value product database 500 that may be stored in memory 430 (Stored Value Product Platform 400) according to some embodiments. The table 500 may include, for example, the authorization record with entries identifying profile information for a card product used to purchase two stored value products. The table 500 may define fields 502, 504, 506, 508, 510 and 512 for each of the entries. The fields 502, 504, 506, 508, 510 and 512, may, according to some embodiments, specify: a card account PAN 502 to purchase the stored value products, a stored value product identifier 504, an amount stored value 506, a currency 508, an MCC 510 and an amounts, additional field 512 (e.g., an aggregate of the amount of stored value in the stored value products in the purchase transaction). Other suitable fields may be used in addition to, or instead of, the fields listed herein. The stored value product database 500 may be created and updated, for example, based on information electrically received on a periodic basis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a stored value product module. The method steps can then be carried out using the distinct software modules and/or sub-modules of the system, as described above, executing on one or more hardware processors 410 (FIG. 4). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
    identifying, by a merchant device, at least one stored value product to be purchased is included in a purchase transaction;
    calculating, via the merchant device, an amount of stored value on the stored value product;
    receiving a payment authorization request for the purchase transaction via a payment card product, wherein the payment card product is used to purchase the stored value product, wherein the payment authorization request is received at a computer, and the payment authorization request is received from the merchant device;
    transmitting, from the computer, the payment authorization request and information associated with the stored value product to an issuer of the payment card product, wherein the issuer of the payment card product includes a stored value product database, and the issuer of the payment card product is different from the issuer of the stored valued product;
    inserting supplemental identifying data for the stored value product into a private data element portion of an authorization record generated at the stored value product database of the issuer of the payment card product, the insertion based on an analysis of the transmitted information;
    tracking the stored value product via the inserted supplemental identifying data; and
    accessing, by the issuer of the payment card product, the inserted supplemental identifying data in the authorization record in a case that the issuer of the payment card product receives a notification that the purchase of the stored value product was a fraudulent transaction.

2. The method of claim 1, wherein the stored value product is a product that retains a value at the time of purchase.

3. The method of claim 1, wherein identifying the stored value product further comprises:
    determining, at the merchant device, a stock keeping unit (SKU), a universal product code (UPC), or a payment account number (PAN) associated with the stored value product matches a corresponding SKU, UPC or PAN in a merchant table.

4. The method of claim 3, wherein the information associated with the stored value product comprises at least one of the SKU, UPC or PAN.

5. The method of claim 4, wherein at least a portion of the transmitted information is stored in the authorization record associated with the issuer of the card payment product.

6. The method of claim 5, wherein the stored transmitted information is stored in an existing shared field of the authorization record.

7. The method of claim 4, further comprising:
    executing a clearing transaction, by the merchant device, wherein at least a portion of the transmitted information is stored in a clearing record associated with the clearing transaction.

8. The method of claim 7, wherein the stored transmitted information is stored in an existing shared field of the clearing record.

9. The method of claim 7, wherein the clearing transaction is initiated subsequent completion of the purchase transaction.

10. The method of claim 1, further comprising:
    activating the stored value product via receipt of one of a stock keeping unit (SKU), a universal product code (UPC), or a payment account number (PAN) associated with the stored value product.

11. The method of claim 1, further comprising:
    receiving, by the merchant device, an authorization approval from the issuer of the payment card product.

12. The method of claim 11, wherein the authorization approval is a partial approval of the request for an amount less the calculated amount of stored value on the stored value product.

13. The method of claim 1, further comprising:
    storing, in a database, the transmitted information associated with the stored value product.

14. The method of claim 1, wherein the stored value product comprises:
    a prepaid card, an air time card, a travelers cheque, a purchase of foreign currency, a money order, a purchase of precious metals, and a savings bond.

15. The method of claim 1 wherein the purchase transaction is in a single currency.

16. The method of claim 1 further comprising:
    determining authorization of the purchase transaction based on the supplemental identifying data.

17. A system comprising:
    a communication device operative to communicate with a merchant device to obtain a request for authorization to use a payment card product for a purchase transaction;
    a stored value product processor; and
    a memory in communication with the stored value product processor and storing program instructions, the stored value product processor operative with the program instructions to perform functions as follows:
        identifying at least one stored value product to be purchased is included in a purchase transaction;
        calculating, via the merchant device, an amount of stored value on the stored value product;
        receiving a payment authorization request for the purchase transaction via a payment card product, wherein the payment card product is used to purchase the stored value product, wherein the payment authorization request is received at a computer, and the payment authorization request is received from the merchant device;
        transmitting the payment authorization request and information associated with the stored value product to an issuer of the payment card product, wherein the issuer of the payment card product includes a stored value product database, and the issuer of the payment card product is different from the issuer of the stored value product;
        inserting supplemental identifying data for the stored value product into a private data element portion of an authorization record generated at the issuer of the payment card product, the insertion based on an analysis of the transmitted information;
        tracking the stored value product via the inserted supplemental identifying data; and
        accessing, by the issuer of the payment card product, the inserted supplemental identifying data in the authorization record in a case that the issuer of the payment card product receives a notification that the purchase of the stored value product was a fraudulent transaction.

18. The system of claim 17, wherein the stored value product is a product that retains a value at the time of purchase.

19. The system of claim 17, wherein the information associated with the stored value product comprises one of a stock keeping unit (SKU), a universal product code (UPC), or a payment account number (PAN).

20. The system of claim 19, wherein at least a portion of the transmitted information is stored in an existing shared field of the authorization record associated with the issuer of the card payment product.

* * * * *